(12) United States Patent
Eswaran et al.

(10) Patent No.: US 7,995,584 B2
(45) Date of Patent: Aug. 9, 2011

(54) METHOD AND APPARATUS FOR DETECTING MALICIOUS ROUTERS FROM PACKET PAYLOAD

(75) Inventors: Anand Eswaran, Bangalore (IN); Ravindra Guntur, Mysore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 12/141,927

(22) Filed: Jun. 19, 2008

(65) Prior Publication Data

US 2009/0028160 A1    Jan. 29, 2009

(30) Foreign Application Priority Data

Jul. 26, 2007 (IN) ............................ 1614/CHE/2007

(51) Int. Cl.
*H04L 12/56* (2006.01)
(52) U.S. Cl. .......... 370/395.32; 726/24; 726/25; 726/26
(58) Field of Classification Search .................. 370/392, 370/395.32; 726/23, 24; 713/168, 181
See application file for complete search history.

(56) References Cited

U.S. PATENT DOCUMENTS

| | | | |
|---|---|---|---|
| 6,789,156 B1 * | 9/2004 | Waldspurger | 711/6 |
| 6,868,488 B2 * | 3/2005 | Garthwaite | 711/173 |
| 7,584,507 B1 * | 9/2009 | Nucci | 726/23 |
| 7,735,135 B1 * | 6/2010 | Zhou | 726/22 |
| 7,747,078 B2 * | 6/2010 | Kencl et al. | 382/181 |
| 2002/0001384 A1 * | 1/2002 | Buer et al. | 380/30 |
| 2002/0035687 A1 * | 3/2002 | Skantze | 713/168 |
| 2003/0074562 A1 * | 4/2003 | Hansen et al. | 713/176 |
| 2004/0064737 A1 * | 4/2004 | Milliken et al. | 713/201 |
| 2005/0086520 A1 * | 4/2005 | Dharmapurikar et al. | 713/201 |
| 2007/0115986 A1 * | 5/2007 | Shankara | 370/392 |
| 2009/0100055 A1 * | 4/2009 | Wang | 707/6 |

\* cited by examiner

*Primary Examiner* — Hassan Kizou
*Assistant Examiner* — Emmanuel Maglo

(57) ABSTRACT

The method, apparatus and system of detecting whether a router is compromised and configured to place malicious packets onto the network are disclosed. In one embodiment, a method for detecting a malicious router includes performing hash on a current ingress packet received via the network packet payload to generate ingress packet hash values. Further, includes performing hash on current egress packet that is associated with the current ingress packet to generate egress packet hash values. The generated ingress packet hash values and the egress packet hash values are then compared. Then the router is checked to determine whether it is potentially compromised and configured to place the malicious packets based on the outcome of the comparison.

20 Claims, 5 Drawing Sheets

METHOD AND APPARATUS FOR DETECTING MALICIOUS ROUTERS FROM PACKET PAYLOAD

FILED OF THE INVENTION

The present invention relates generally to computer and communication networks and more particularly relates to techniques for detecting malicious routers from packet payloads.

BACKGROUND

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

In addition to the foregoing packet forwarding operations, there may be a need to search packet payloads for a given string or set of strings. For example, security applications may need to search for certain strings indicative of a virus or Internet worm that is present in the packet payload, such as for load balancing or billing purposes.

The ever increasing number of computers, routers and connections marking up the Internet increases the number of vulnerable points from which these malicious individuals can launch attacks. These attacks can be focused on the Internet as a whole or on specific devices, such as hosts or computers, connected to the network. In fact, each router, switch, or computer connected to the Internet may be a potential entry point from which a malicious individual can launch an attack while remaining largely undetected. Attacks carried out on the Internet often consist of malicious packets being injected into the network. Malicious packets can be injected directly into the network by a computer, or a device attached to the network, such as a router or switch, can be compromised and configured to place malicious packets onto the network.

Searching packet payloads presents a problem with respect to line-rate packet forwarding. The reason for this is that string searches may be very time consuming, especially, if the strings are relatively long. With the network line-rates significantly increasing every year, it is becoming increasingly difficult for software and hardware based solutions to operate at these increasing line rates. Further, bulk of packets received by the routers are forwarded rather than consumed by them and given the increasing line-rates, detection of malicious packets can become extremely difficult.

Current techniques monitor signatures in a network payload by storing a predefined signature of a predetermined length. Further, a data stream on the network is monitored for a signature which corresponds to the predefined signature. Furthermore, using an analyzer, whether the network signature corresponds to the predefined signature and is a false positive is determined. These techniques are used for pattern matching applications, such as network security, application specific service differentiation, QoS enhancement and network engineering and so on. Further, such implementations can be very hardware intensive and an increase in the width of the data-bus to support counter-fields can result in noticeable speed reduction for a wide-bit vector. In addition, these techniques can require complicated application specific integrated circuit (ASIC) layout.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, an apparatus, and a system for detecting a malicious router during transmission of a network packet payload are disclosed. In the following description, for purposes of explanation, numerous specific details are set forth in order to provide a thorough understanding of the various embodiments. It will be evident, however, to one skilled in the art that the various embodiments may be practiced without these specific details.

The terms "search string", "string", and "packet" are used interchangeably throughout the document. Further, the terms "switch" and "router" are used interchangeably throughout the document. Furthermore, the terms "Bloom unit" and "Bloom filters" are used interchangeably throughout the document.

Figure 1:
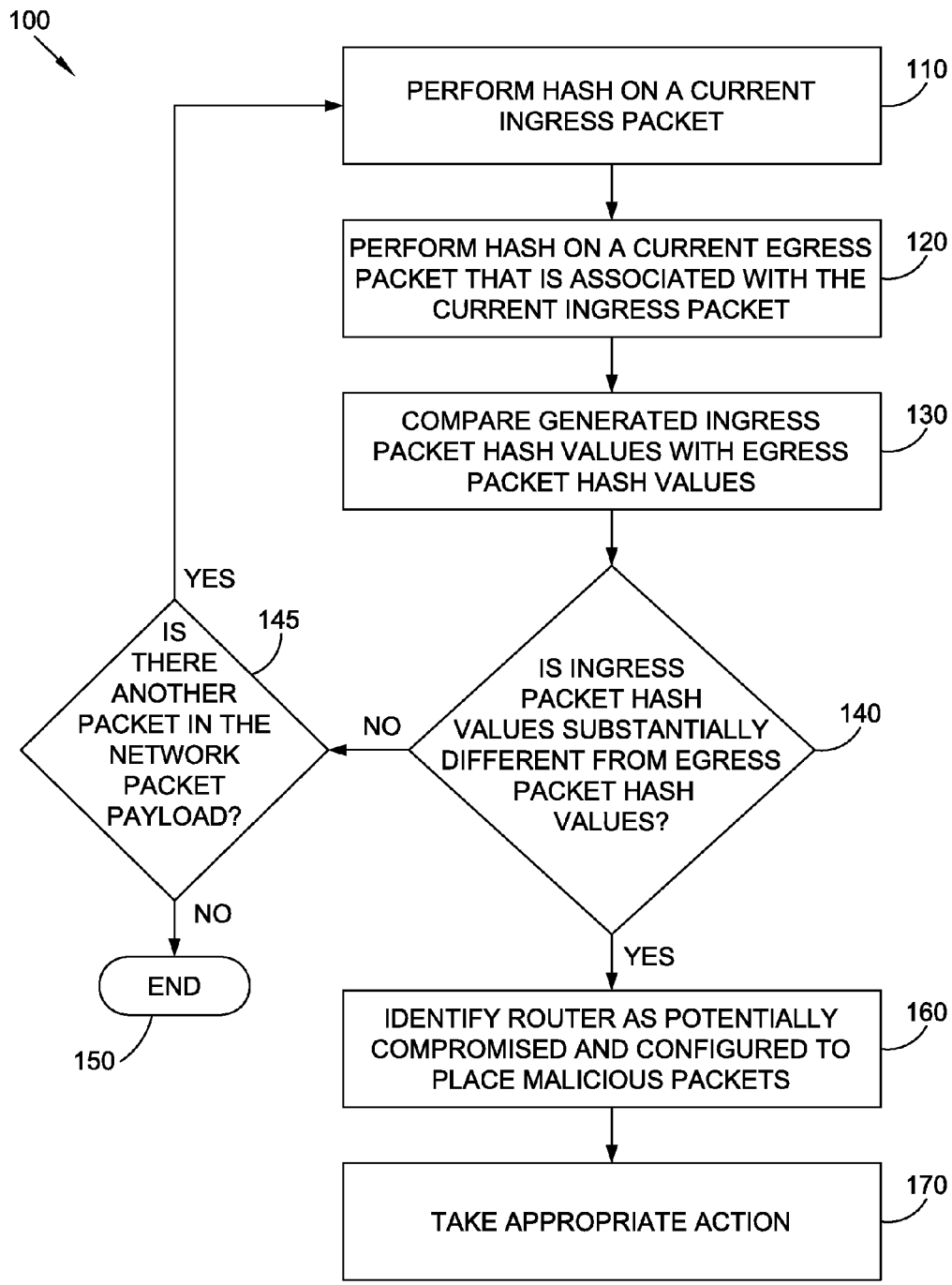
FIG. 1 is a process flow of detecting a malicious router during transmission of packet payload, according to one embodiment.

FIG. 1 is a process flow 100 illustrating detection of a router that is compromised and configured to place malicious packets on to a network packet payload, according to one embodiment. In operation 110, hashing is performed on a current ingress packet received by a router via the network packet payload to generate associated ingress packet hash values. In some embodiments, the network packet payload arrives as TCP/IP data. In operation 120, hashing is performed on a current egress packet to generate associated egress packet values substantially before the current egress packet exits the router. In these embodiments, the current ingress packet that is leaving the router is named as the current egress packet.

In some embodiments, hashing is performed using a hash unit on each current ingress packet and current egress packet to generate respective ingress and egress packet hash values. In these embodiments, each of the ingress and egress packet hash values is stored in a hash buffer. In some embodiments, one or more packet hash values are generated based on variable-sized hash blocks of the current ingress packet and current egress packet. In these embodiments, a cluster of Bloom filters that is configured by trusted remote software, such as simple network management protocol (SNMP) management station, is used during switch boot-up time. The Bloom filters partition the current ingress packet and current egress packet into sub-packets where each sub-packet works on different portions of the current ingress packet and current egress packet, such as data-link header, Internet Protocol (IP) header, layer 4 headers, payload and so on to parallelize the operation. For example, each of the current ingress packet and current egress packet can have sub-packets of type H2, H3, H4 and so on, wherein HX refers to the layer×header, with the possibility of one or more headers being absent. In these embodiments, each Bloom filter accepts as input associated sub-packets of the current ingress packet and current egress packet and performs hashing and outputs respective k hash values in the range of 1 to Ri.

In operation 130, the generated ingress packet hash values and egress packet hash values are compared substantially after the current egress packet exits the router. In operation 140, the process flow 100 determines whether the router is potentially compromised and configured to place malicious packets based on the outcome of the comparison at operation 130. In some embodiments, in operation 140, the process flow 100 determines whether the ingress packet hash values and the egress packet hash values are substantially different. In some embodiments, in operation 140, the process flow 100 determines whether the ingress packet hash values and the egress packet hash values are same.

Based on the determination at operation 140, the process flow 100 then goes to operation 160 and identifies the router as potentially compromised and configured to place the malicious packets in the network packet payload if the ingress packet hash values and the egress packet hash values are different. In operation 170, an appropriate action is taken on the current egress packet upon identifying the router as potentially compromised and configured to place the malicious packets in the network packet payload. Exemplary appropriate actions include dropping the current egress packet, forwarding the current egress packet, logging the current egress packet and the like.

Based on the determination at operation 140, the process flow 100 goes to operation 145 and determines if there is another packet in the network packet payload waiting to enter the router. Based on the determination at operation 145, the process flow 100 goes to operation 110 and repeats operations 110-170 if there is another packet in the network packet payload waiting to enter the router. Based on the determination at operation 145, the process flow 100 goes to operation 150 and ends the detection of whether the router is compromised and configured to place malicious packets in the network packet payload if there is no other packet waiting to enter the router.

In some embodiments, the ingress packet hash values and the egress packet hash values are stored in a hash buffer. The ingress packet hash values and the egress packet hash values are then rehashed to generate associated ingress and egress rehashed values. The ingress and egress rehashed values are then compared to determine whether they are substantially different. The router is then identified as potentially compromised and configured to place the malicious packets in the network packet payload if the ingress and egress rehashed values are found to be substantially different.

In some embodiments, the ingress packet hash values associated with the current ingress packet that assisted in determining whether the router is potentially compromised and configured is stored. The current ingress packet in the network packet payload is identified as a potentially malicious packet.

It can be see that the above-described technique includes determining the difference in the input-side finger-print (obtained by hashing each packet in a network packet payload at the input side of a router) and output-side finger-print (obtained by similarly hashing each associated packet at the output side of the router) to identify a malicious router. However, packets that are destined to be delivered to the router only (even though by hashing these packets can result in a difference between the input-side finger-print to the output-side finger-print) may not be hashed based on the router identifying datalink header, info/IP header info, and the like in each packet entering the router.

Figure 2:
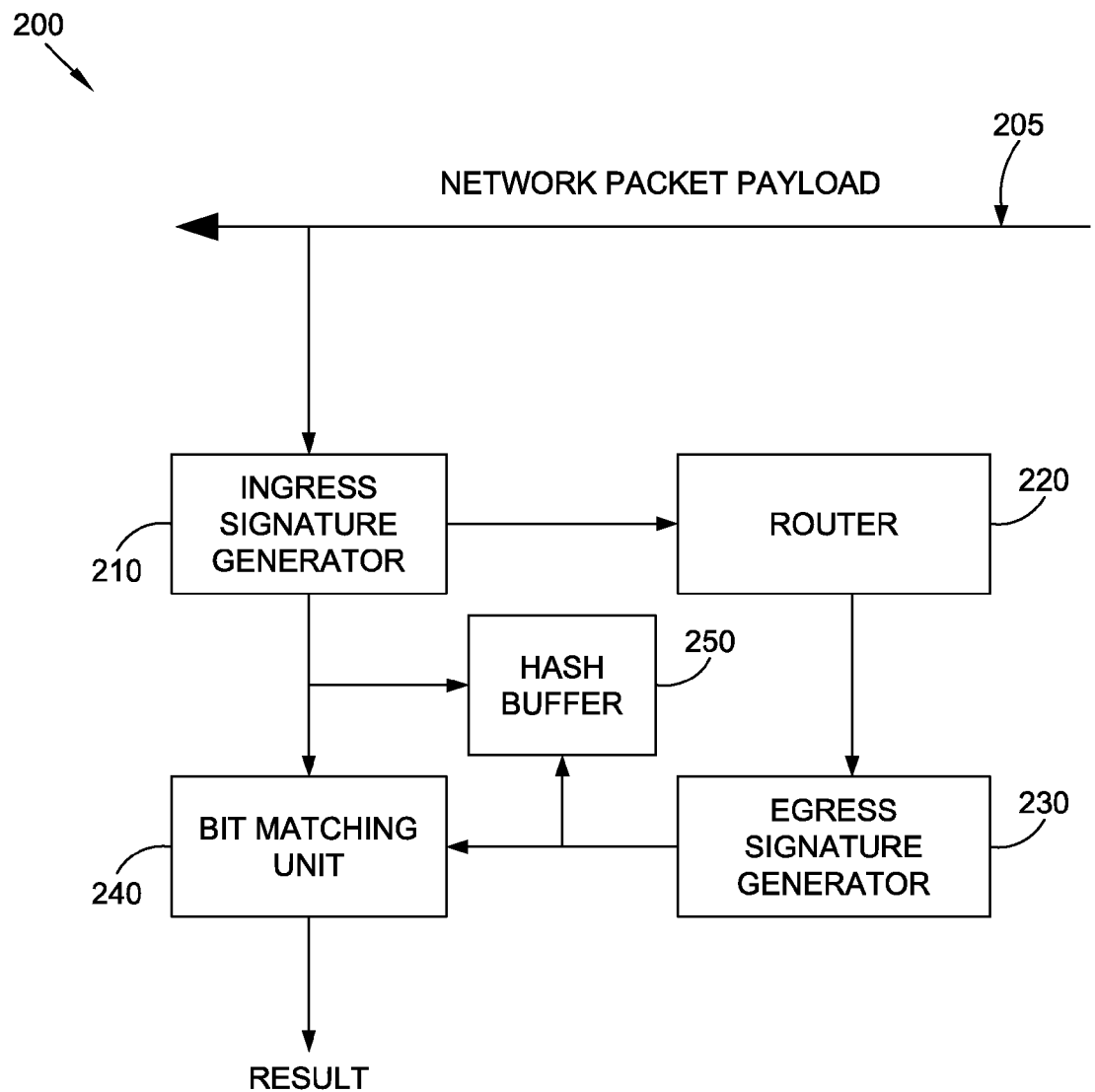
FIG. 2 is a block diagram illustrating using signature generators for detecting a malicious router during transmission of network packet payload, according to one embodiment.

FIG. 2 is a block diagram illustrating using signature generators for detecting a malicious router during transmission of network packet payload, according to one embodiment. Particularly, FIG. 2 illustrates a system 200 that includes an incoming network packet payload 205, an ingress signature generator 210, a router 220, an egress signature generator 230, a bit matching unit 240, and a hash buffer 250. In operation, the ingress signature generator 210 receives a current ingress packet from a network packet payload and performs hash on the current ingress packet and generates respective ingress packet hash values substantially before entering the router 220. The hash buffer 250 then stores the generated ingress packet hash values. The egress signature generator 230 receives a current egress packet that is associated with the current ingress packet and generates egress packet hash values substantially after exiting the router 220. The bit matching unit 240 receives and compares the ingress packet hash values from the hash buffer 250 and the egress packet hash values from the egress signature generator 230 to determine whether the router is potentially compromised and configured to place malicious packets in the network packet payload.

In some embodiments, the bit matching unit 240 determines whether the ingress packet hash values and the egress packet hash values are substantially different. The bit matching unit 240 then identifies the router 220 as potentially compromised and configured to place the malicious packets in the network packet payload if the ingress packet hash values and the egress packet hash values are substantially different. The bit matching unit 240 takes appropriate action on the current egress packet upon identifying the router 220 as potentially compromised and configured to place the malicious packets in the network packet payload. The operation of the system 200 to identify a malicious router is explained in more detail with respect to FIG. 1.

Figure 3:
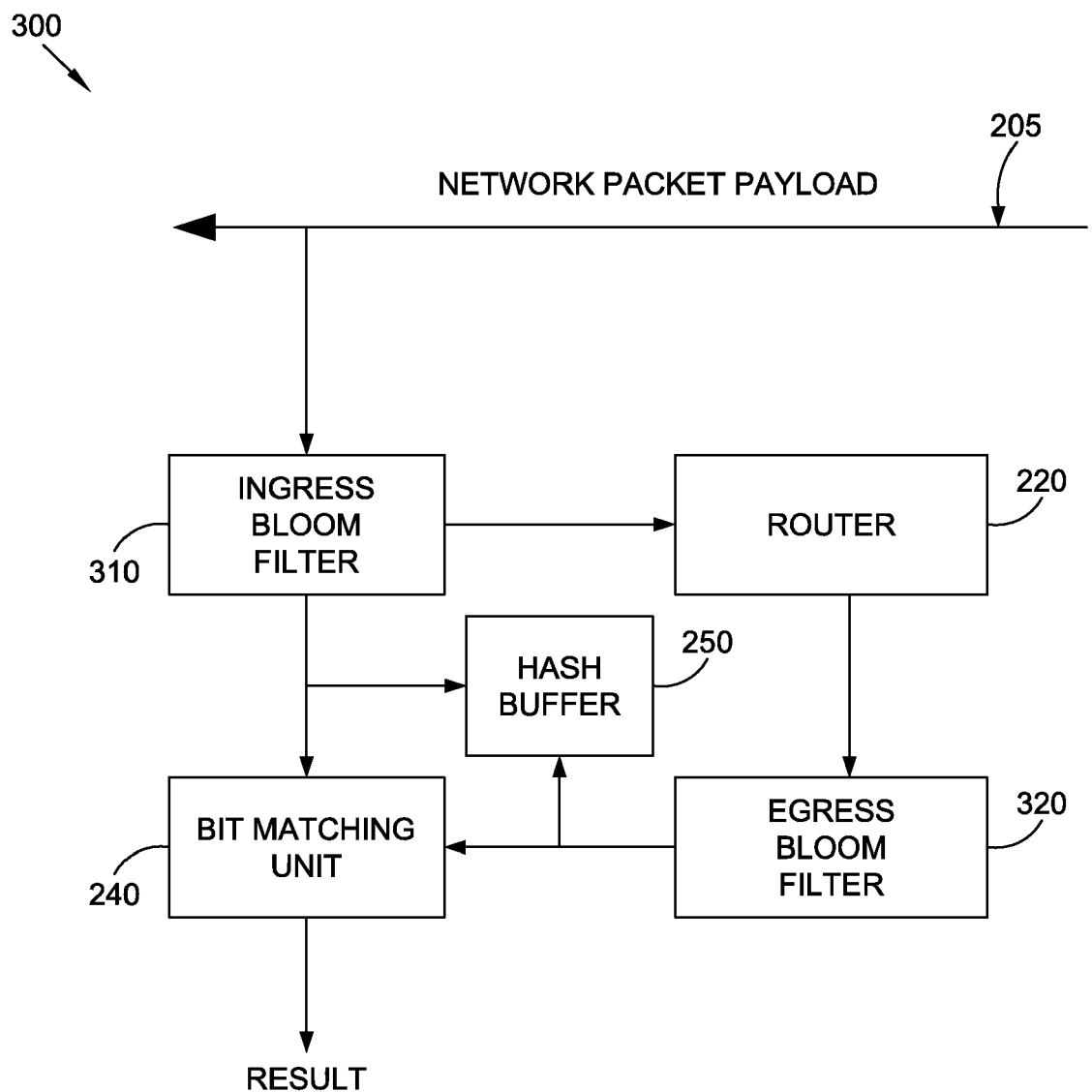
FIG. 3 is a block diagram illustrating using Bloom filters for detecting a malicious router during transmission of network packet payload, according to one embodiment.

FIG. 3 is a block diagram illustrating using Bloom filters for detecting a malicious router during transmission of network packet payload, according to one embodiment. Particularly, FIG. 3 illustrates a system 300 that is similar to the system 200 shown in FIG. 2, except that the system 300 uses egress and ingress Bloom filters 310 and 320 are in place of the ingress and egress signature generators 210 and 230 used in FIG. 2 for hashing the current ingress packet and the current egress packet. The operation of system 300 is similar to what is described for system 200 with reference to FIG. 2.

Figure 4:
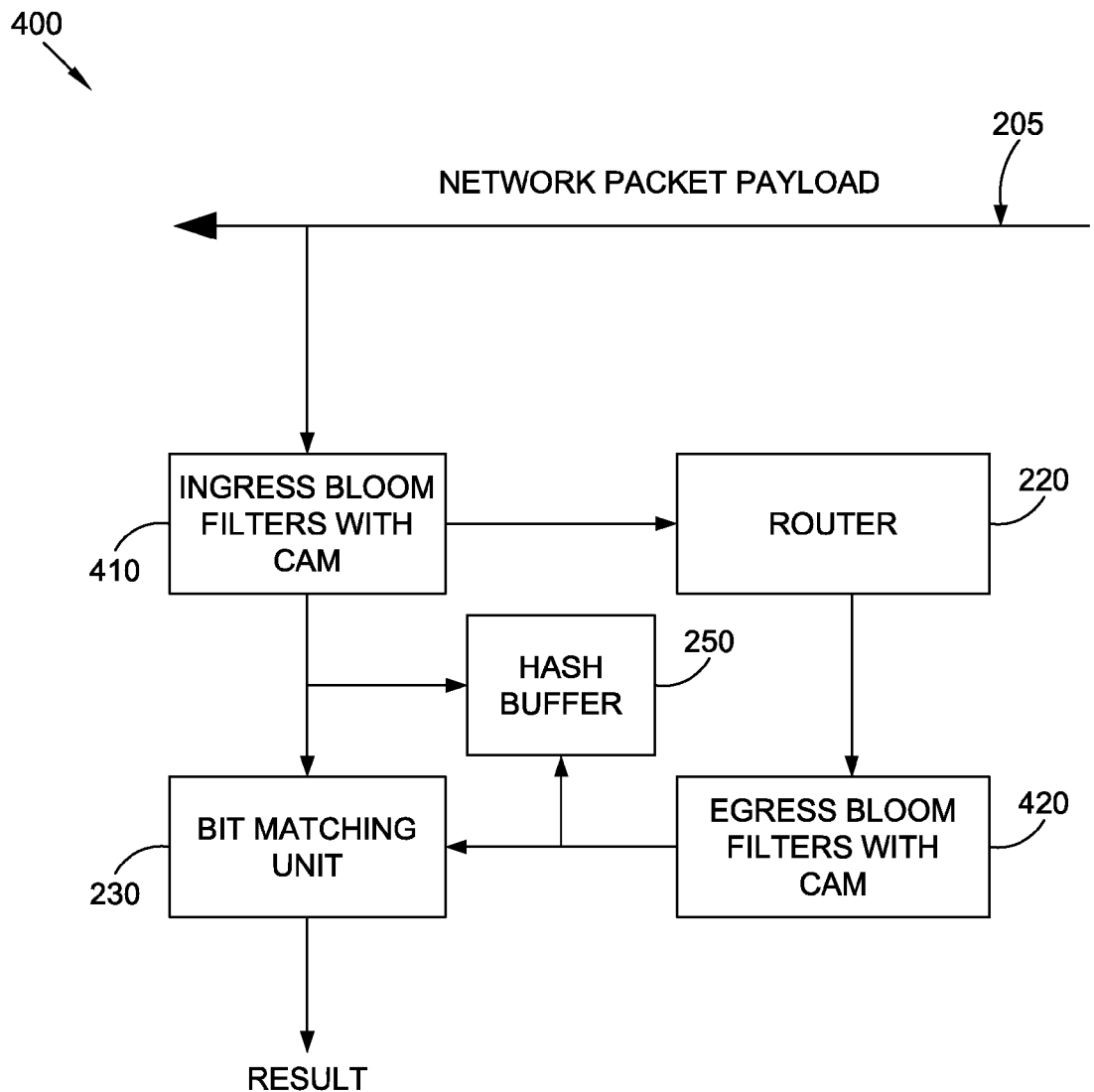
FIG. 4 is a block diagram illustrating using Bloom filters along with a Content Addressable Memory (CAM) for detecting a malicious router during transmission of network packet payload, according to one embodiment.

FIG. 4 is a block diagram illustrating a system 400 that uses Bloom filters with Content Addressable Memory (CAM) units for detecting a malicious router during transmission of network packet payload, according to one embodiment. The system 400 in FIG. 4 is similar to the system 200 shown in FIG. 2, except that in the system 400 uses egress and ingress Bloom filters with CAM units 410 and 420 in place of the ingress and egress signature generators 210 and 230, respectively, for hashing the current ingress packet and the current egress packet. The operation of the system 400 is similar to what is described for the system 200 with reference to FIG. 2 except that the system 400 uses Bloom filters with CAM units 410 420 to rehash the ingress packet hash values and the egress packet hash values.

Figure 5:
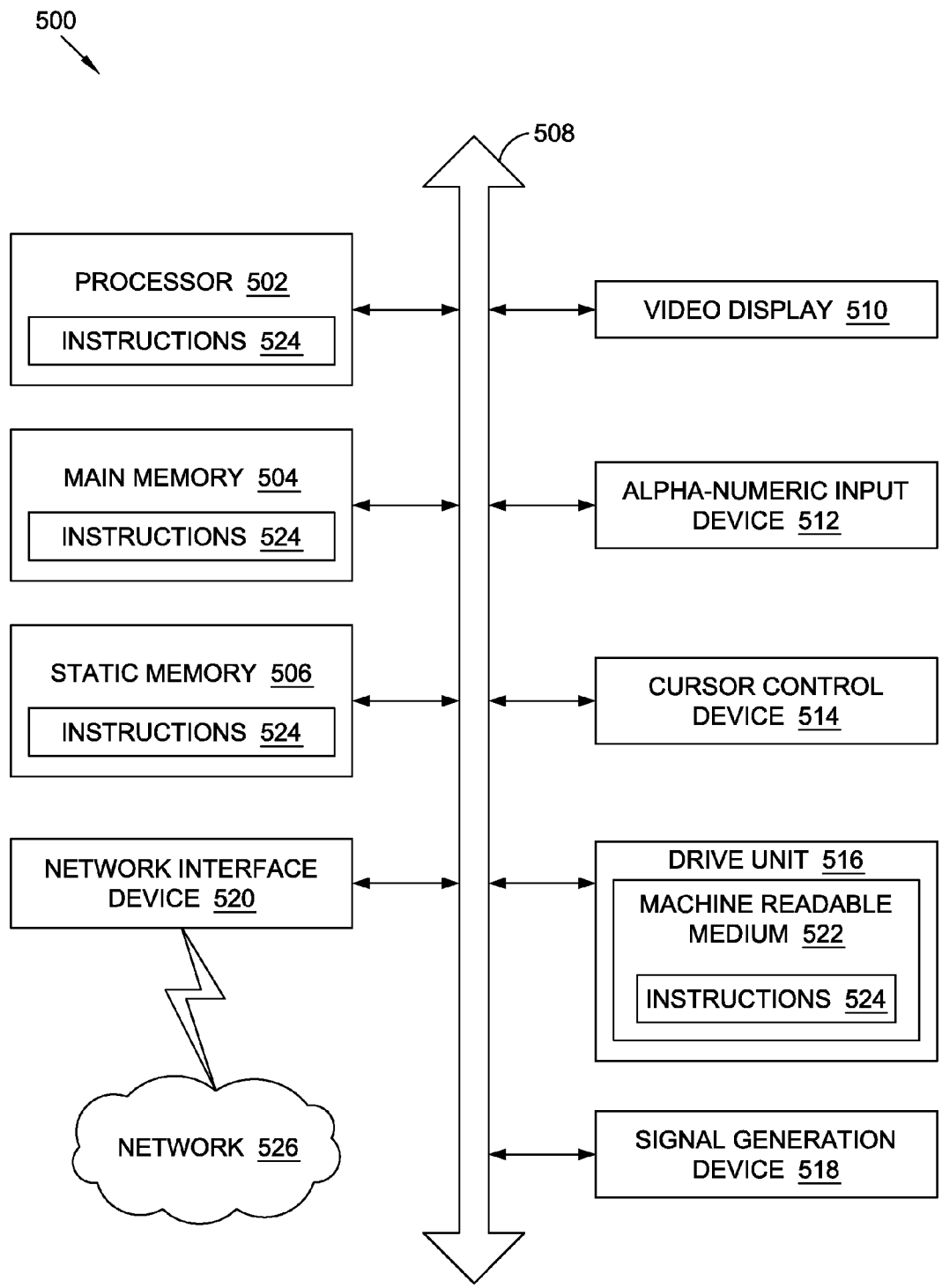
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. (e.g., Intel® Pentium® processor). The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a bios and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one/or more operations disclosed herein.

For example, a storage medium having instructions, that when executed by a computing platform executes a method for detecting whether a router is compromised and configured to place malicious packets onto the network packet payload, includes performing hash on a current ingress packet received by the router via the network packet payload to generate ingress packet hash values, performing hash on a current egress packet to generate egress packet hash values substantially before exiting the router, wherein the current egress packet is associated with the current ingress packet, comparing the generated ingress packet hash values and the egress packet hash values substantially before the current egress packet exits the router, and determining that the router is potentially compromised and configured to place the malicious packets based on the outcome of the comparison.

The storage medium may have instructions to determine whether the ingress packet hash values and the egress packet hash values are substantially different, and if so, to identify the router as potentially compromised and configured to place the malicious packets in the network packet payload.

The storage medium may further have instruction to store the ingress packet hash values and egress packet hash values in a hash buffer, perform rehash on the ingress packet hash values and egress packet hash values to generate associated ingress and egress rehashed values, determine whether the ingress and egress rehashed values are substantially different, and if so to identify the router as potentially compromised and configured to place the malicious packets in the network packet payload.

Furthermore, a computer system includes a processing unit and a memory coupled to the processor. The memory has code stored therein for exact string matching in a network packet payload. The code causes the processor to perform hash on a current ingress packet received by the router via the network packet payload to generate ingress packet hash values, perform hash on a current egress packet to generate egress packet hash values substantially before exiting the router, wherein the current egress packet is associated with the current ingress packet, compare the generated ingress packet hash values and the egress packet hash values substantially before the current egress packet exits the router, and determine that the router is potentially compromised and configured to place the malicious packets based on the outcome of the comparison.

The above technique can be used to determine whether one router is sending routing updates to another router connected to the network. The above technique can also be used to determine whether a router forward traffic from source network A further upstream to a destination network B. Further, the above technique can be used to determine whether router A generates traffic claiming to be router B. Furthermore, the above technique can be used to determine whether a disproportionate amount of traffic is passing through a router X targeted at destination network Y. Moreover, the above technique can be used to determine whether a host H (nearest to a router X) is involved in a transmission control protocol sync (TCP SYN) attack or a Denial of Service (DoS) attack.

The above technique facilitates scaling to identify whether forwarding router is malicious. Further, the above technique can be designed to not to trust switch software running above it. Furthermore, the above technique can be used to determine a wide variety of routing misbehaviors, such as packet tampering, packet dropping, packet creation and the like. Moreover, using the Bloom filters can yield a tamper-proof architecture that works well in a centralized network where a trusted SNMP management station can monitor the security of the network. In addition, it can be envisioned that the above technique can be used for detecting transmission of potentially malicious packets in packet payload.

In one embodiment, the above technique uses a counting Bloom filter, which is a variant to Bloom filters, which indexes into an array of a counter that counts packets (rather than a bit array) for each of the k hash outputs. Using such counting Bloom filters can allow counting multiplicities of events, and such data can be used for monitoring DoS attacks allowing cross verifying flow volumes across multiple routers and the like.

In another embodiment, the above technique uses Bloom filters that are configured by trusted remote software, such as an SNMP management station, during switch boot-up time. In these embodiments, each search sting is broken into sub search-strings that are associated with different portions of a search string, such as data-link header, Internet protocol (IP) header, layer 4 header, payload and so on to maximize parallelism. Further, each search string can be considered to include a string of type $H_2$, $H_3$, $H_4$, Payload and so on), where $H_X$ refers to a layer X header.

It is possible that one or more headers can be absent in a search string. In these embodiments, each Bloor filter accepts as input the relevant sub-portion of a search string as input and returns k values in the range of 1 to Ri. The Bloom filter then increments k counter locations in a dedicated memory counter array, such as a static random access memory (SRAM) counter array. The associated counters are then indexed by the values output by the Bloom filter to represent each search string on the forwarding path by a set of k unique locations which are in turn incremented in the memory counter array.

It can be seen that the SRAM counter array can be tamper-proof and difficult to manipulate or modify by the router firmware. The Bloom filter logging unit is generally a very secure unit and can only be configured/polled from a network management station using a secure authentication-based protocol. Also it can be seen that the raw counter-arrays cannot be sent to the firmware as the router software can be untrustworthy and the compromised router can manipulate the counter array information. This can be overcome by sending an encrypted version of the counter-arrays using a key that can be shared between the secure hardware and the management station. This encrypted counter-arrays information can be securely transferred to the network management station using a standard secure interface such as SNMP trap.

Another aspect of the above technique is that the Bloom filter search strings assume that the firmware is untrustworthy and its counter array log serves as a non-repudiatable proof of having seen the search strings that match particular patterns. Since firmware in router is generally untrustworthy, the above technique provides in-built support for hardware symmetric key encryption in the Bloom unit so that only encrypted information can be transferred from the Bloom unit to the master CPU before it is transferred to the management station.

In some embodiments, packets are logged on the ingress side of each switch and relay the encrypted counter array logs to the network management station, substantially subsequent to which the counter array is reset to all-zeros. The relaying of information can be done using a push-based protocol where each node can periodically send updates to the management station or a pull-based protocol where the management host can query the router for updated logs.

In another embodiment, the above technique checks whether the incoming packets are being modified using a forwarding router without having to rely on the packets having to be sent securely to a management station. In these embodiments, each incoming packet (generated by the switch that do not have the switch as the source address) is passed through two Bloom filters, i.e., one Bloom filter located at the input side of the router and the other located on the output side of the Bloom filter, as shown in FIGS. 3 and 4, and logged in associated scratchpad SRAM counter arrays. The input and output side Bloom filter counter arrays are then periodically compared against each other. Based on the comparison, if any of the bits in the input and output side Bloom filter counter arrays are found to be set then it can be inferred that the forwarding router could be modifying the contents in the packets on the forwarding path. This could in turn be set to cause a trap to be generated to the management host to indicate the possibility of a compromised router. In these embodiments, the verification of the valid behavior of the forwarding router can be done by a trusted hardware without having to rely on the network management host. It can be envisioned that different routers can be queried by the management station for sophisticated attacks involving the need to cross verify bit array logs of multiple routers.

In some embodiments, the above two techniques are combined to determine whether a router is compromised and configured to place malicious packets in the network. For example, the router can include 2 Bloom filters as described above (i.e., one on the ingress side and the other on the egress side of the router). The counter vectors on the input side and the output side can be periodically compared and if any significant variations in the counter values or the number of patters are found based on the comparison, then the router can be identified as compromised and configured to place malicious packets in the network. It can be seen that the change in counter values can also be due to 2 Bloom filters being not synchronized even when a router is operating normally because the packets in a network packed payload can be queued up inside a router that have passed through the input Bloom filters but not yet reached the output bloom filters.

It can be seen that positioning of the Bloom filters in the switch can affect the bits that are set in the SRAM bit-arrays. Especially, if the Bloom filters are located substantially just after the ingress buffers, it can only log traffic on the forwarding path. However, it can be seen that if the Bloom filters are located substantially before the egress buffers, the router can log forwarding-path traffic as well as traffic generated by the switch firmware.

It can also be seen the width of the bit array m and the number of hash functions k can be design parameters for hardware Bloom units. Even though bloom filters can use entire width of the bit array (i.e., 0 to m−1), each of the k hash units of a Bloom filter can operate exclusively on a specific non-overlapping portion of the data and in turn can update contents of specific non-overlapping sub-range of the counter array.

It can be envisioned that the above technique allows masking certain bits in a search string header that are likely to be modified on a fast path account modification and can use the same hash functions across multiple boxes, i.e., can be enforced such that the same search string can almost always tag to the associated bit. For example, certain fields in a packet are generally modified by a router during packet forwarding. This is in accordance with the routing Request for comments (RFC). In such a scenario, these fields are masked by using bit-masks so that they do not look like modified packets to the router, otherwise the router will flag them as malicious.

This can allow an IP router to ignore certain fields, such as the TTL (Time To Live) that are updated in the router on the forwarding path to comply with standards, such as RFC (Request for Comments).

In some embodiments, the log information obtained by the above technique is transferred when a management stations queries the Bloom unit associated with a router. In these embodiments, the management station sends a request to Bloom software module that resides in the un-trusted firmware of the router. The software module then uses a standard API (Application Programming Interface) to request the current contents of the counter array from the Bloom unit. The Bloom unit upon receiving the request uses its hardware encryption unit to encrypt the counter array using its shared key with the management station. The encrypted string is then returned to the un-trusted firmware, which in turn forward the packet to the management station. The management station then uses the shared key to decrypt the content of the received message and retrieves the counter arrays of the router.

Also, the above-described method may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of detecting whether a router is compromised and configured to place malicious packets onto the network, comprising:
    performing hash on a current ingress packet received by the router via the network packet payload to generate ingress packet hash values;
    performing hash on a current egress packet to generate egress packet hash values substantially before exiting the router, wherein the current egress packet is associated with the current ingress packet;
    comparing the generated ingress packet hash values and the egress packet hash values substantially before the current egress packet exits the router; and
    determining that the router is potentially compromised and configured to place the malicious packets based on the outcome of the comparison.

2. The method of claim 1, wherein determining that the router is potentially compromised and configured comprises:
    determining whether the ingress packet hash values and the egress packet hash values are substantially different; and
    if so, then identifying the router as potentially compromised and configured to place the malicious packets in the network packet payload.

3. The method of claim 1, further comprising:
    storing the ingress packet hash values and egress packet hash values in a hash buffer;
    performing rehash on the ingress packet hash values and egress packet hash values to generate associated ingress and egress rehashed values;
    determining whether the ingress and egress rehashed values are substantially different; and
    if so, then identifying the router as potentially compromised and configured to place the malicious packets in the network packet payload.

4. The method of claim 1, further comprising:
    repeating the steps of performing hash on the current ingress packet, performing hash on the current egress packet, comparing, and determining on a next packet in the network packet payload.

5. The method of claim 1, wherein performing hash on a current ingress packet received via the network packet payload to generate ingress packet hash values and performing hash on a current egress packet to generate egress packet hash values comprises:
    employing a plurality of Bloom filters to perform hash on the current ingress packet received via the network packet payload to generate ingress packet hash values and to perform hash on the current egress packet to generate egress packet hash values.

6. The method of claim 1, further comprising:
    taking an appropriate action on the current egress packet in the network packet payload upon identifying the router as potentially compromised and configured to place the malicious packets and wherein the appropriate action includes dropping the current egress packet, forwarding the current egress packet and logging the current egress packet.

7. The method of claim 1, wherein the network packet payload arrives as TCP/IP data.

8. The method of claim 1, wherein performing hash on a current ingress packet and performing hash on a current egress packet comprises:
    performing hash on variable-sized blocks in the current ingress packet to generate respective ingress packet hash values; and
    performing hash on variable-sized blocks in the current egress packet to generate respective egress packet hash values.

9. The method of claim 1, further comprising:
    storing the ingress packet hash values associated with the current ingress packet used in determining whether the router is potentially compromised and configured; and
    identifying the current ingress packet in the network packet payload as a potentially malicious packet.

10. An article, comprising:
    a non-transitory storage medium having instructions, that when executed by a computing platform, result in execution of a method of detecting whether a router is compromised and configured to place malicious packets onto the network, comprising:
    performing hash on a current ingress packet received by the router via the network packet payload to generate ingress packet hash values;
    performing hash on a current egress packet to generate egress packet hash values substantially before exiting the router, wherein the current egress packet is associated with the current ingress packet;
    comparing the generated ingress packet hash values and the egress packet hash values substantially before the current egress packet exits the router; and
    determining that the router is potentially compromised and configured to place the malicious packets based on the outcome of the comparison.

11. The article of claim 10, wherein determining that the router is potentially compromised and configured comprises:
    determining whether the ingress packet hash values and the egress packet hash values are substantially different; and
    if so, then identifying the router as potentially compromised and configured to place the malicious packets in the network packet payload.

12. The article of claim 10, further comprising:
    storing the ingress packet hash values and egress packet hash values in a hash buffer;
    performing rehash on the ingress packet hash values and egress packet hash values to generate associated ingress and egress rehashed values;
    determining whether the ingress and egress rehashed values are substantially different; and
    if so, then identifying the router as potentially compromised and configured to place the malicious packets in the network packet payload.

13. The article of claim 10, further comprising:
    repeating the steps of performing hash on the current ingress packet, performing hash on the current egress packet, comparing, and determining on a next packet in the network packet payload.

14. The article of claim 10, further comprising:
    taking an appropriate action on the ingress packet in the network packet payload upon identifying the router as potentially compromised and configured to place the malicious packets and wherein the appropriate action is selected from the group consisting of dropping the packet, forwarding the packet and logging the packet.

15. A system for detecting a malicious router, comprising:
ingress signature generator configured to receive a current ingress packet in a network packet payload and perform hash on the current ingress packet and generate ingress packet hash values;
a hash buffer to store the generated ingress packet hash values;
egress signature generator configured to generate egress packet hash values on said packet after that packet has experienced processing by the router; and
a bit matching unit configured to receive and compare the ingress packet hash values and egress packet hash values, respectively, and determine whether the router is potentially compromised and configured to place malicious packets based on the outcome of the comparison.

16. The system of claim 15, wherein the bit matching unit determines whether the ingress packet hash values and the egress packet hash values are substantially different and wherein the bit matching unit identifies the router as potentially compromised and configured to place the malicious packets in the network packet payload if the ingress packet hash values and the egress packet hash values are substantially different.

17. The system of claim 15, wherein the ingress signature generator and egress signature generator each comprises signature generators selected from a group consisting of a plurality of Bloom filters, a plurality of Bloom filters with bit counters and a plurality of Bloom filters with a CAM.

18. The system of claim 15, wherein the bit matching unit takes an appropriate action on the current egress packet upon identifying the router as potentially compromised and configured to place the malicious packets.

19. The system of claim 15, wherein the network packet payload arrives as TCP/IP data.

20. A method of detecting whether a router is compromised and configured to place malicious packets onto the network, comprising:
performing hash on a packet when that packet is received by the router to generate ingress packet hash values;
performing another hash on said packet before said packet exits the router to generate egress packet hash values;
comparing the generated ingress packet hash values and the egress packet hash values; and
if said generated ingress packet has values differ from said egress packet has values, determining that the router is potentially compromised and configured to place the malicious packets.

* * * * *